United States Patent [19]
Leonard et al.

[11] Patent Number: 5,901,289
[45] Date of Patent: May 4, 1999

[54] METHOD AND SYSTEM FOR REAL-TIME DISPLAYING OF MPEG-2 COMPRESSED VIDEO DATA WITHIN AN ELECTRONIC TEST EQUIPMENT

[75] Inventors: Mark A. Leonard, Richmond; Trevor S. R. Dyck, Burnaby; Peter Wai-Wah Ma, Vancouver, all of Canada

[73] Assignee: Hewlett Packard Company, Palo Alto, Calif.

[21] Appl. No.: 08/838,842

[22] Filed: Apr. 11, 1997

[51] Int. Cl.⁶ .................................................... G06F 13/00
[52] U.S. Cl. .............................. 395/200.54; 395/200.63; 395/200.77
[58] Field of Search ..................................... 345/349, 346, 345/511, 340; 395/330, 200.34, 888, 200.54, 200.63; 348/8

[56] References Cited

U.S. PATENT DOCUMENTS

| | | | |
|---|---|---|---|
| 5,321,807 | 6/1994 | Mumford | 345/511 |
| 5,414,809 | 5/1995 | Hogan et al. | 345/349 |
| 5,491,795 | 2/1996 | Beaudet et al. | 345/346 |
| 5,594,859 | 1/1997 | Palmer et al. | 395/330 |
| 5,721,958 | 2/1998 | Kikinis | 395/888 |
| 5,767,894 | 6/1998 | Fuller et al. | 348/8 |
| 5,802,294 | 9/1998 | Ludwig et al. | 395/200.34 |

*Primary Examiner*—Zarni Maung
*Assistant Examiner*—Philip B. Tran

[57] ABSTRACT

A system and method for displaying MPEG-2 packets as a hierarchy of tables within a window of a graphical display. This hierarchial display is updated continuously as new packets are received, thus providing a real time display. When a packet is received, and the location of that packet has not been identified, the packet is placed at the top of the hierarchy. Once a subsequent packet is received wherein the subsequent packet identifies the location of the earlier received packet, the earlier received packet is moved to its correct location within the hierarchy. When a user of the system clicks one of the tables within the hierarchy, the system saves the next data packet or packets containing data for the table into a display table buffer. The system then displays a second window and formats the data from the display table buffer into the second window.

5 Claims, 7 Drawing Sheets

METHOD AND SYSTEM FOR REAL-TIME DISPLAYING OF MPEG-2 COMPRESSED VIDEO DATA WITHIN AN ELECTRONIC TEST EQUIPMENT

FIELD OF THE INVENTION

This invention relates to electronic test systems. More particularly, the invention relates to displaying MPEG-2 compressed video data within an electronic test instrument.

BACKGROUND OF THE INVENTION

Video data may be compressed using the MPEG-2 standard before being sent from one location to another. During this compression, the elementary stream data is compressed and formatted into a hierarchy of sub-records and record types, called packets. That is, the lowest level of stream data is first formatted into a PES or PSI packet, which is further formatted into a TS packet, which is further combined into an AAL-5 PDU packet, which is part of an ATM cell packet. Thus, display of this type of data requires a hierarchial display of each of these packets in order to interpret the display of the data.

Because of the complexity of the MPEG-2 data, prior art systems capture data in real time and store the data, however, they only format and display the data after it has been captured and stored. Thus, the offline formatting and display of the data can reduce the complexity of the data. This creates a problem, however, because of the data display occurring later than the data being transmitted. The main reason for the offline display is that the complexity and speed of the data prevents the formatting and real time display of such complex data. Typically, the offline data display contains all the data in the record, and a user scrolls through this display much like scrolling through a word processing document.

Another reason MPEG-2 data has not been displayed in real time is that some packets of the data may be sent before other packets, wherein the later sent packets identify the type of data sent in the earlier packets, and thus identify the location within the hierarchy of the earlier packets. This presents a problem in that a real time display cannot place the packets in their correct location within a display hierarchy until their location is identified by a later packet. Thus the packets must be stored, or processed in some other manner, until a packet identifying their location is received. This is difficult to do in real time.

There is need in the art then for a system and method of displaying the hierarchial MPEG-2 data in real time. There is further need in the art for such a system and method that formats only selected data for display without formatting an entire packet, thus simplifying the display. A still further need is for such a system and method that displays packets even if the location of the packet in the hierarchy is unknown until a later packet is received. The present invention meets these and other needs in the art.

SUMMARY OF THE INVENTION

It is an aspect of the present invention to display MPEG-2 Program Specific Information (PSI) data in real time.

It is another aspect of the invention to provide a hierarchial display of MPEG-2 PSI tables and other types of tables in real time.

Another aspect is to display a table at its correct location, when the location of the table is known, and to display a table at a top of the hierarchy until its correct location is known.

A further aspect of the invention is to acquire and display a snapshot of a table when requested by a user.

The above and other aspects of the invention are accomplished in a system and method that displays MPEG-2 PSI Tables as a hierarchy of tables within a window of a graphical display. This hierarchial display is updated continuously as new packets are received, thus providing a real time display.

When a packet containing a table or partial table is received, and the location of that packet has not been identified, the packet is placed at the top of the hierarchy. Once a subsequent packet is received wherein the subsequent packet identifies the location of the earlier received packet, the earlier received packet is moved to its correct location within the hierarchy.

When a user of the system clicks one of the tables within the hierarchy, the system saves the current data packet or packets that make up the requested table into a display table buffer. The system then displays a second window and formats the data from the display table buffer into the second window.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
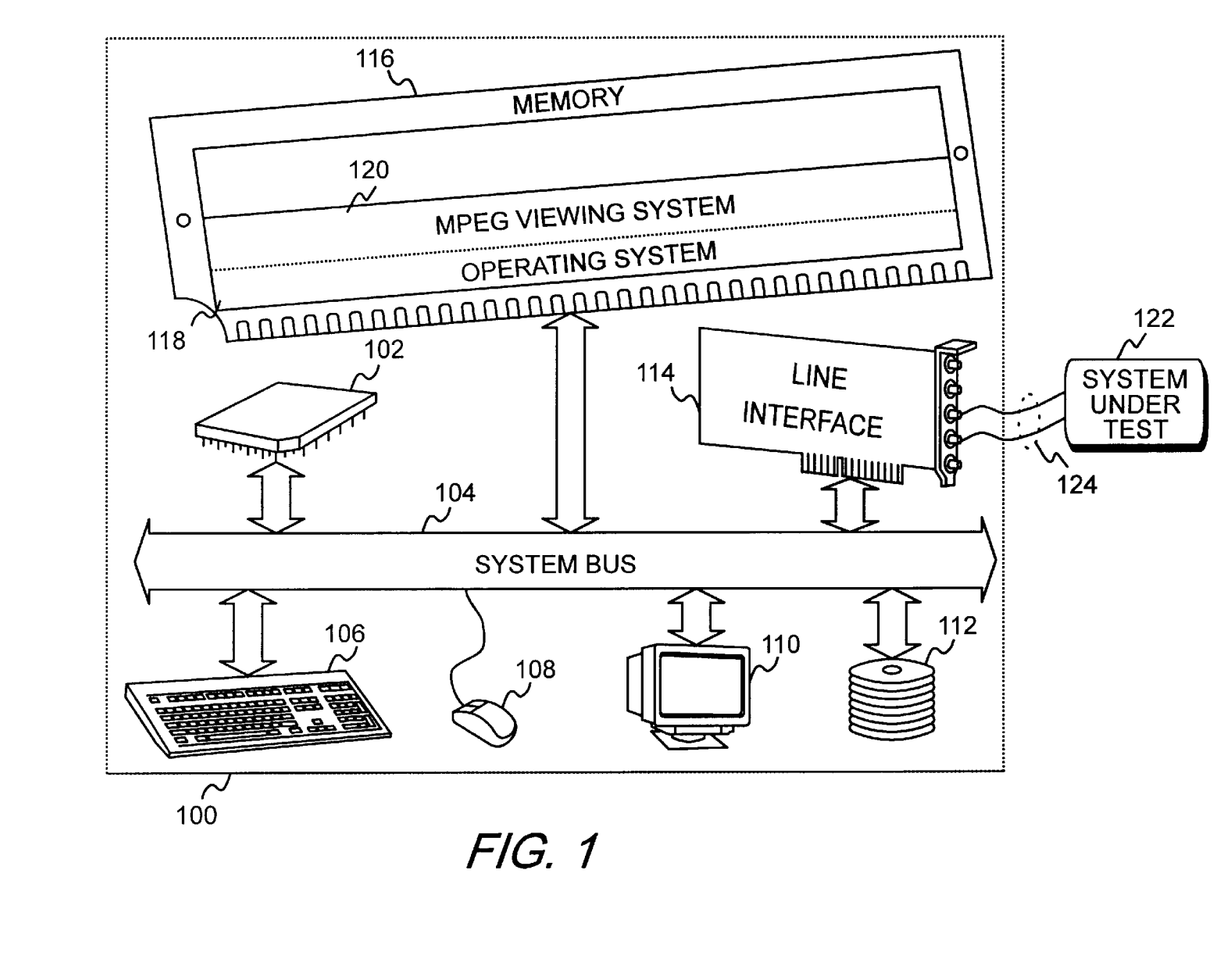
FIG. 1 shows a block diagram of a computer system incorporating the invention.

FIG. 1 shows a block diagram of a computer system incorporating the present invention. Referring now to FIG. 1, a computer system 100 contains a processing element 102 which communicates to other elements of the computer system 100 over a system bus 104. A keyboard 106 and a mouse device 108 allow input to the computer system 100 while a graphics display 110 allows software within the computer system 100 to output information to a user of the computer system 100. A disk 112 stores the software and data of the present invention.

A memory 116 is connected to the system bus 104 and contains an operating system 118. The operating system 118 may be any one of a number of commercially available operating systems, such as the Unix® operating system.

Also within the memory 116 is the MPEG-2 viewing system 120 of the present invention. Those skilled in the art will recognize that the invention can also be used to display other types of tables, such as, for example, Electronic Program Guide tables. The MPEG-2 viewing system 120 monitors a stream of data from a system under test 122. This stream of data is received over a connection 124 by a line interface 114. The data is then transferred from the line interface 114 through the system bus 104 and into the memory 116 and further into the MPEG-2 viewing system 120.

The information in the data stream received over the line 124, is divided into virtual paths and virtual channels. The MPEG-2 viewing system 120 can monitor one of the virtual channels within one of the virtual paths at a time. Within the MPEG-2 data contained within a virtual channel, the MPEG-2 viewing system 120 generates a hierarchial display of many program specific information (PSI) tables and displays this hierarchial information on the display device 110. The user of the system, through the mouse device 108, can select one of the PSI tables displayed within the hierarchial display of data, whereupon the MPEG-2 viewing system 120 presents a second window on the graphical display 110 to display the data within the selected PSI table.

Figure 2:
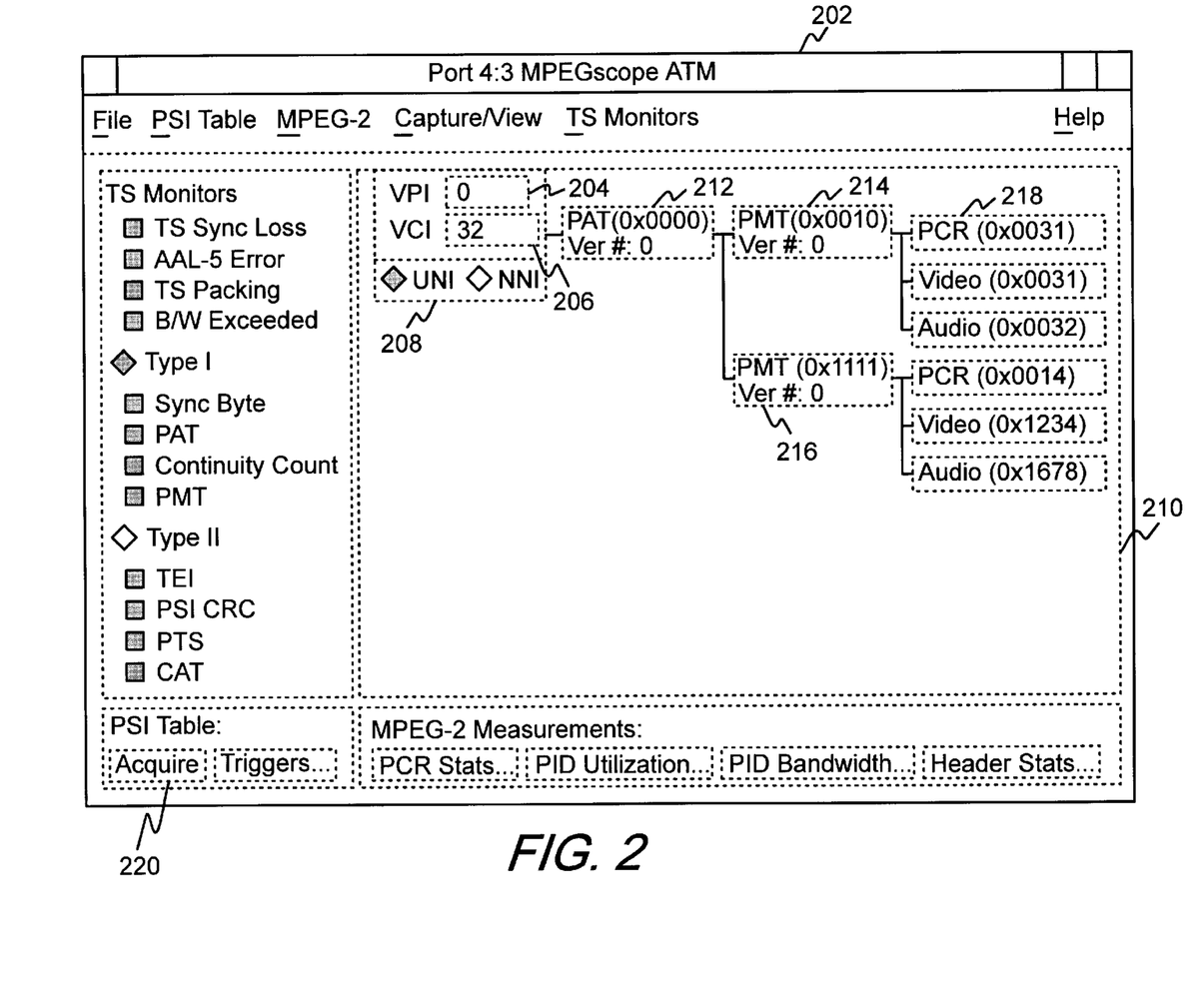
FIG. 2 shows a screen display of the main data display screen of the invention.

FIG. 2 shows a display of the data stream 124 (FIG. 1). Referring now to FIG. 2, a window 202 is used to display the MPEG-2 data received over the line interface 114. Within the window 202, a user of the system selects the virtual path indicator 204 for the desired virtual path. After selecting a virtual path indicator, the user also selects, from within the virtual path, a virtual channel indicator 206. Each virtual path carries a number of channels and the user selects one of these channels for display by entering the number into the VCI area 206. Within area 208, the user selects either user network interface (UNI) or the network node interface (NNI) for display. The selection of UNI or NNI depends upon where the test device is connected to the device being tested.

Once these are selected, the MPEG-2 viewing system 120 (FIG. 1) displays a hierarchial diagram of the program specific information (PSI) tables in the remainder of the display area 210. In the example of FIG. 2, the PSI tables being displayed are the program allocation table (PAT) table 212, program map tables (PMT) 214 and 216 contained within the PAT table 212, and a program clock recovery (PCR) PID 218 contained within the PMT table 214, as well as other tables.

Figure 3:
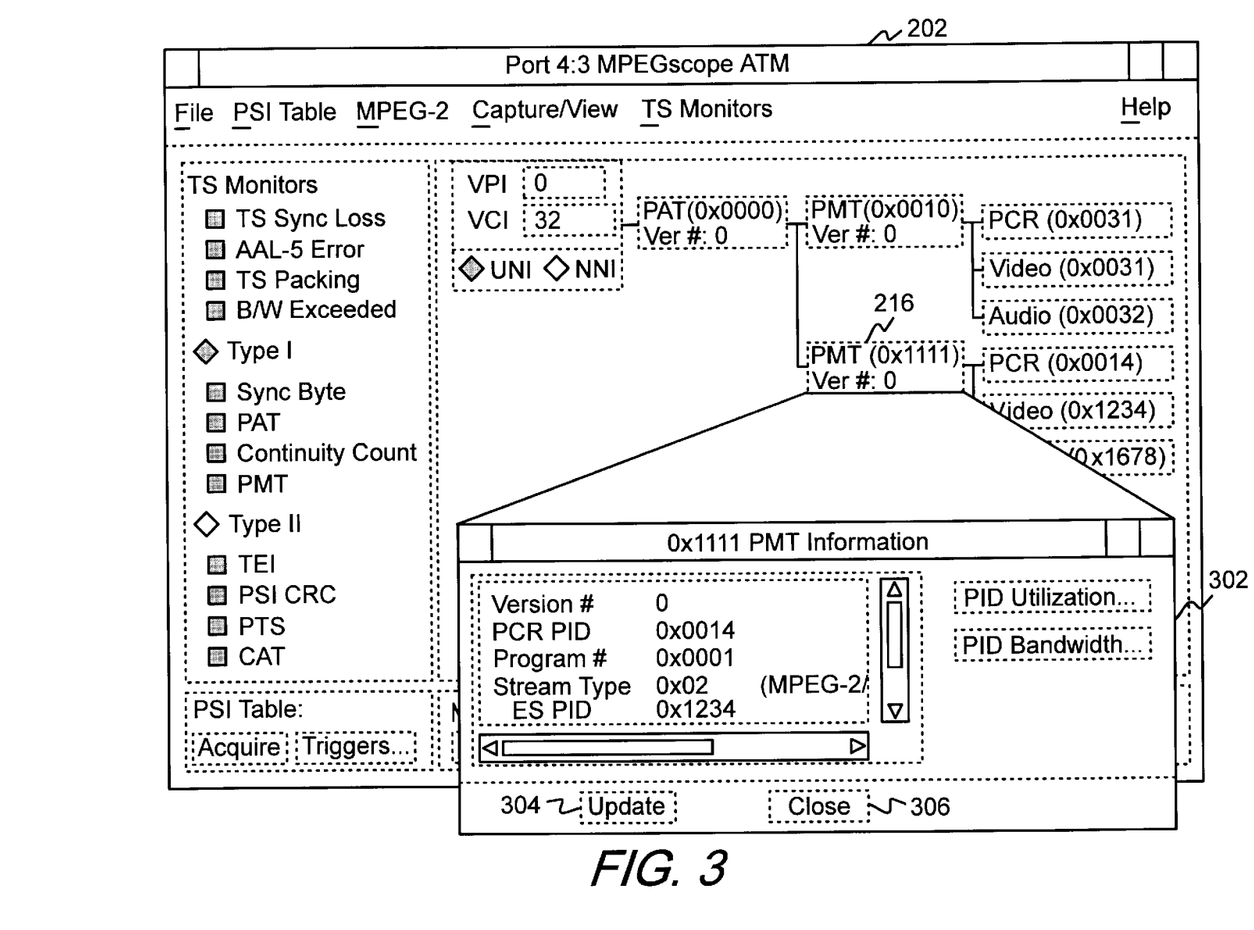
FIG. 3 shows a screen display after a user request to display a table.

The user can select one of the tables within the hierarchy for display, by clicking that table. For example, a user might click PMT table 216 which causes the MPEG-2 viewing system 120 to bring up the display of FIG. 3. Referring now to FIG. 3, window 302 is an expanded display of the PMT table 216. Although shown in FIG. 3 as being located below window 202, in the windows system of the preferred embodiment, the window 302 is displayed on top of a part of window 202. Also in the preferred embodiment of the present invention, the window 302 is displayed non-modal, such that a user may continue to interact with window 202 by clicking another table to create a second window 302 for displaying a second table.

Because the data within window 202 is being displayed in real time, data from new packets, each of which represents one of the tables being displayed, are being continuously updated within the window 202. Since video data can move at a very high rate, and since the window 302 contains very detailed data from the data stream, a continuous display of real time data would cause the data to be unreadable.

Therefore, when the user clicks one of the tables within the hierarchy, for example, PMT table 216, the system of the present invention copies the data packet or packets for the selected table, and saves this data into a table display buffer. Once the data is captured, it is formatted and displayed within the window 302. Since this data is frozen by being saved into the table display buffer, the data within window 302 does not change and can easily be observed by a user of the system.

The user can update the display of FIG. 3 by clicking the Update button 304, which causes the system to save the packet or packets for the most current copy of the table, save the data to the table display buffer as replacement data, and display the data.

Figure 4:
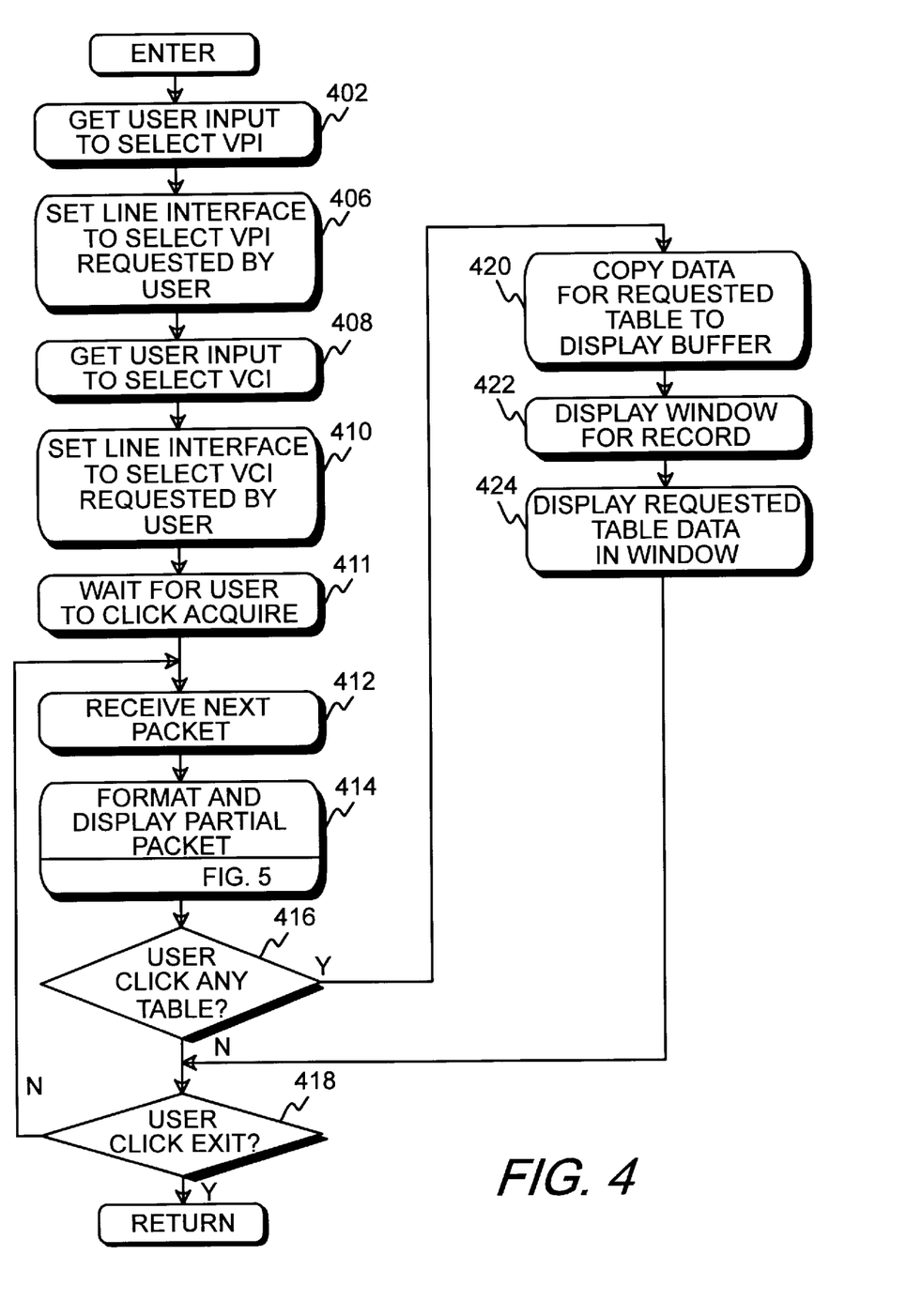
FIG. 4 shows a flowchart of the real time display of information within the invention.
Figure 5:
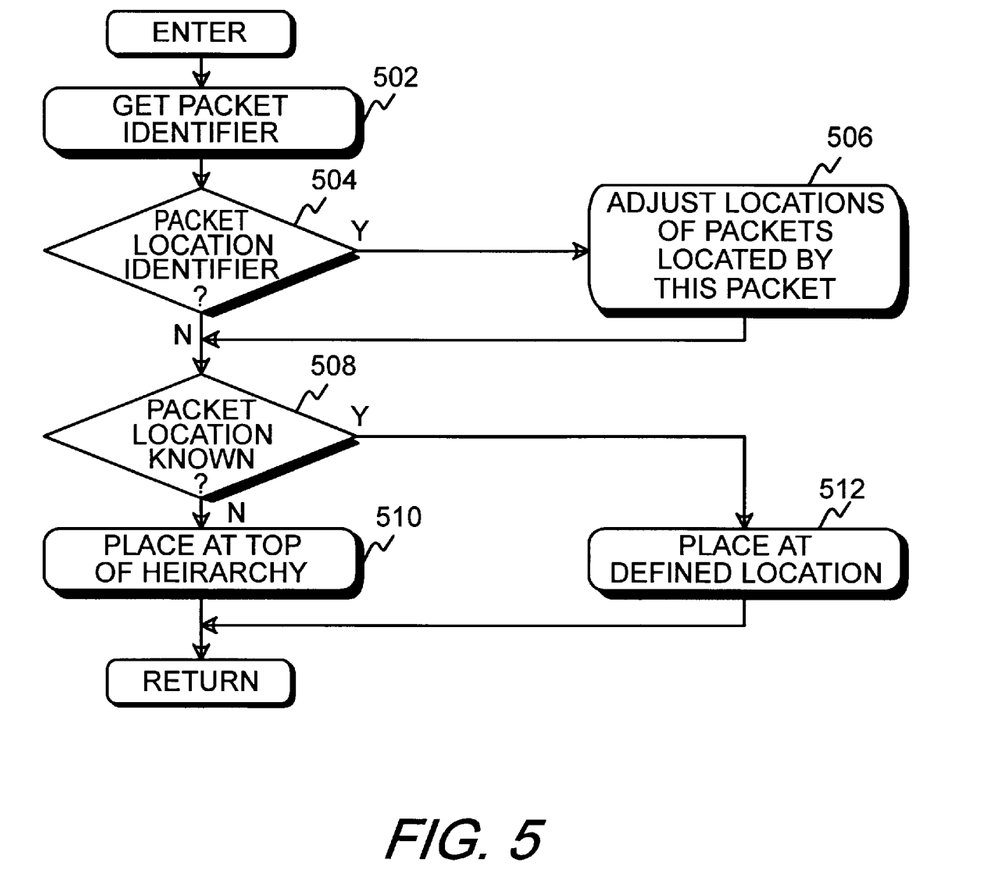
FIG. 5 shows a flowchart of the format and display packet function called from FIG. 4.

FIGS. 4 and 5 show a flowchart of that portion of the MPEG-2 viewing system 120 (FIG. 1) used to create the display shown in FIG. 2 and FIG. 3. Those skilled in the art will recognize that the viewing system of the present invention is a windows system, and is therefore event driven. Therefore, the following flowchart represents the logical flow of control within the system, but does not reflect the actual event driven nature of the system.

FIG. 4 is called by the MPEG-2 viewing system 120 (FIG. 1) to display the MPEG-2 real time data. Referring to FIG. 4, after entry, block 402 gets user input to select the virtual path, and stores a number into the VPI area 204 of FIG. 2. Block 406 then sets the line interface 114 to select the particular virtual path requested by the user in block 402. Block 408 then gets user input to select the virtual channel, and set the VCI indicator 206 (FIG. 2). Block 410 then sets the line interface to select the virtual channel requested by the user in block 408. After setting the line interface, block 411 waits until the user clicks the Acquire button 220 before starting to receive data.

Block 412 then receives the next packet through the line interface 114 and block 414 calls FIG. 5 to format and display the hierarchial table, or partial table, within the packet received in block 412. Block 416 then determines whether the user has clicked any of the tables being displayed, and if not, goes to block 418. Those skilled in the art will recognize that the test of block 416 is actually performed within the windows area of the operating system.

Block 418 then determines whether the user has stopped execution of the system. If the user has not stopped execution, control goes back to block 412 which retrieves and displays the next packet through the line interface 114. Once the user terminates the program, block 418 returns to the caller.

When the user clicks one of the tables for display, block 416 transfers to block 420 which copies the data packet or packets that make up the requested table into a display table buffer. Block 422 then creates a second display window, that is, window 302 shown in FIG. 3, for display of the table data copied in block 420. Block 424 then displays the requested table data from the table buffer into the window and then transfers to block 418 to continue displaying packets in the parent window 202. When the user clicks the Close button 306, the window 302 is removed.

If the user clicks the Update button 304 in window 302, the system performs the functions of block 420, 422, and 424 to save the most recently received data for the table into the table display buffer and then display this data.

FIG. 5 shows a flowchart of the process of formatting and displaying a packet. Referring to FIG. 5, after entry, block 502 gets the packet identifier of the packet. Block 504 then determines whether this is a packet that identifies the location, within the hierarchy, of other packets previously received, called unknown PIDs. If so, block 504 goes to block 506 which adjusts the locations of those packets whose locations are identified by this packet.

If this packet does not identify the locations of other packets, or after adjusting the locations of the other packets, control goes to block 508. Block 508 determines whether the location of this packet is known. If so, block 508 goes to block 512 which displays a graphical symbol for the packet at its known location within the hierarchy.

If block 508 determines that the location of the packet is not yet known, control goes to block 510 which places a graphical symbol for the packet at the top of the hierarchy. The location of the packet will then be adjusted by block 506 when a subsequent packet is received that identifies the location of this packet.

Figure 6:
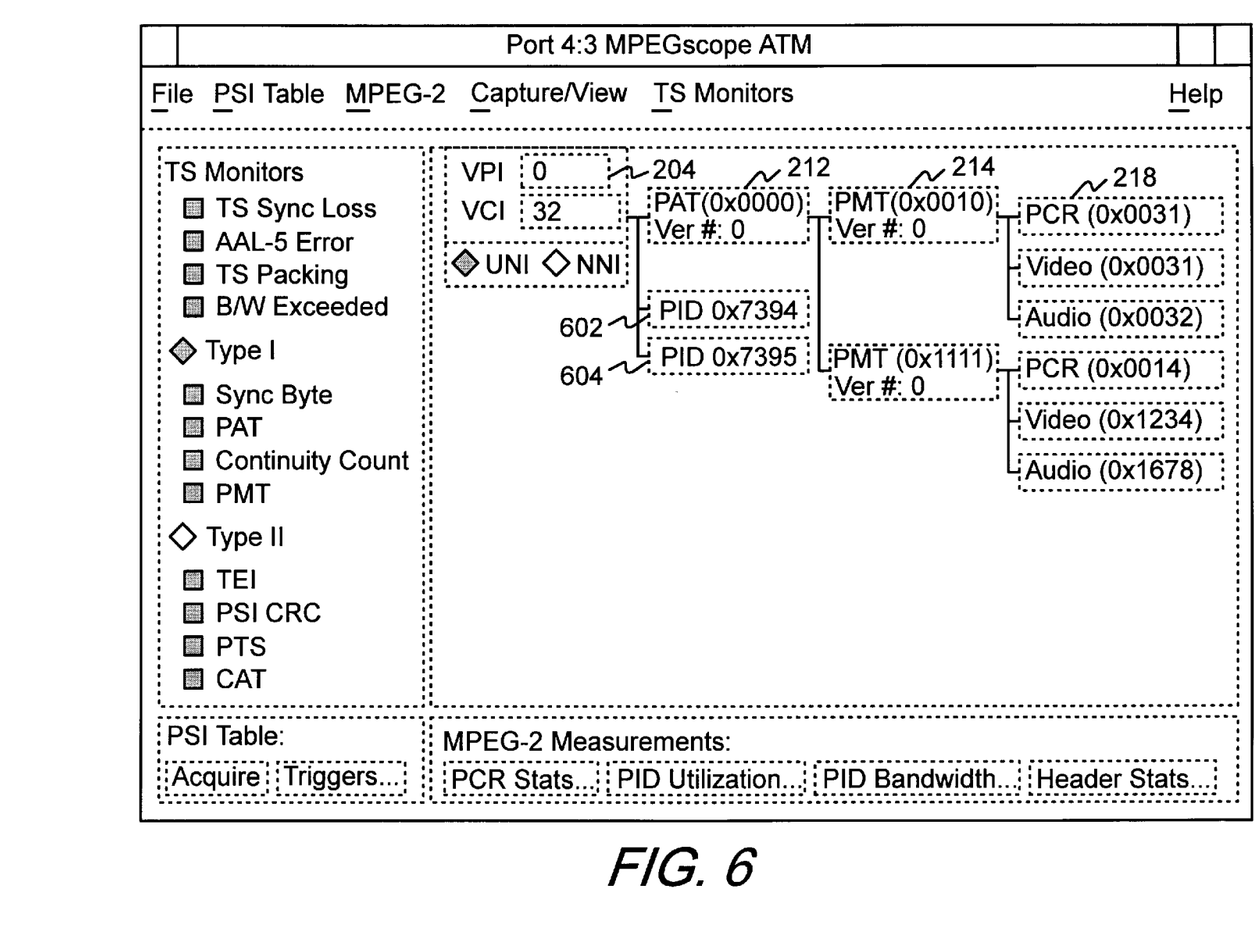
FIG. 6 shows a screen display containing a packet with an unknown location displayed within the hierarchy.

FIG. 6 shows a screen display with unassigned PIDs. Referring to FIG. 6, two packets 602 and 604 were received before a packet identifying them was received. Therefore, these two packets were placed at the top of the hierarchy. Once the packet identifying their location is received, they will be moved, as described above with respect to FIG. 5, into their correct locations.

Figure 7:
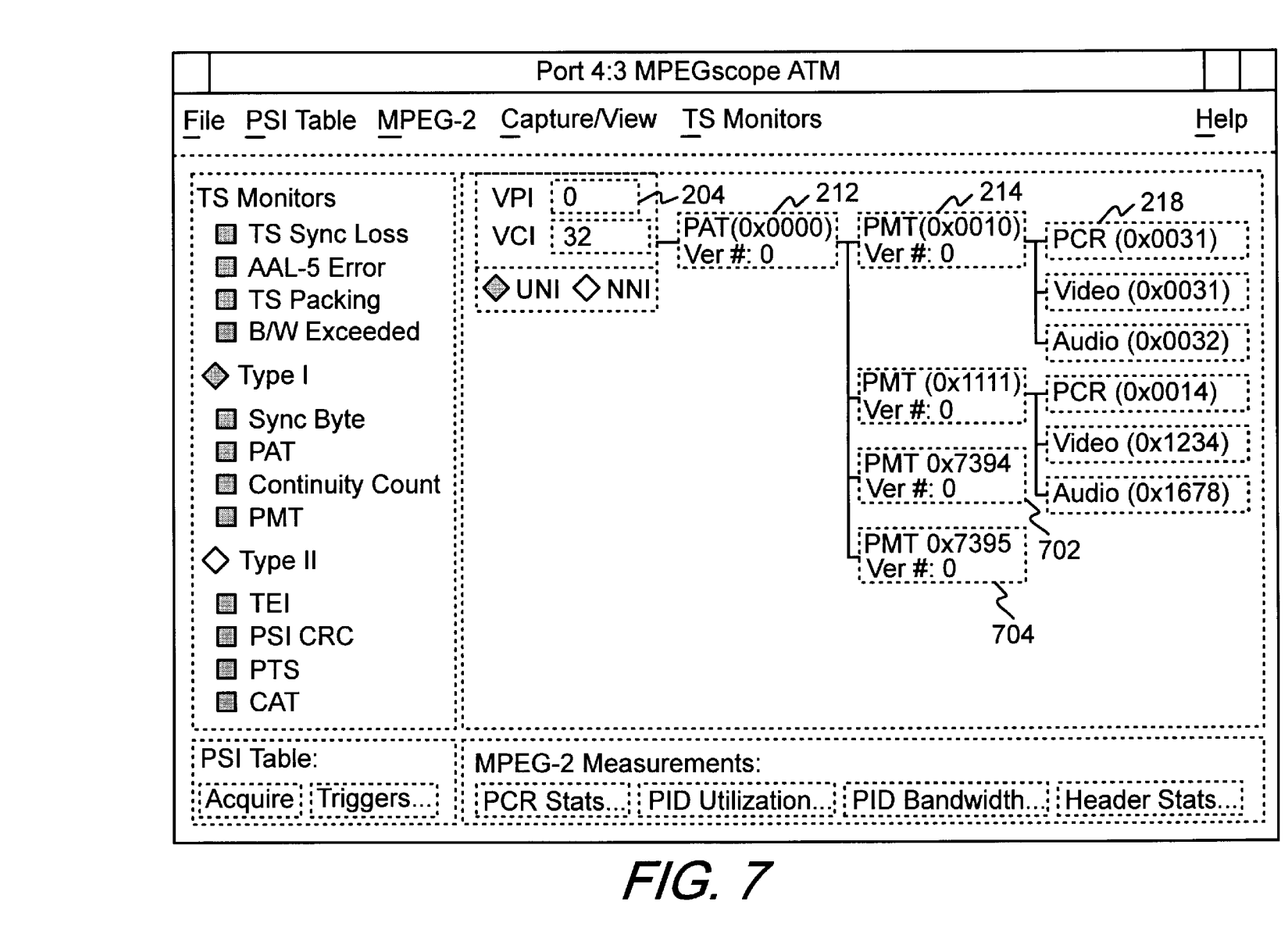
FIG. 7 shows the screen display of FIG. 6 after the packet has been placed in the correct location within the hierarchy.

FIG. 7 shows the screen display of FIG. 6, after receiving the packet that identifies the location of packets 602 and 604. Referring to FIG. 7, the packets 602 and 604 are shown as new tables 702 and 704 respectively. The new packets 702 and 704 have been relocated to their correct locations within the hierarchy, and have been given their correct names.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for displaying data in real time, said method comprising the steps of:
   (a) receiving at least one data packet for display, wherein the at least one data packet represents a table or partial table;
   (b) displaying a graphical image representing the table in a first window of a graphical display device;
   (c) repeating steps (a) and (b) until a stop command in received from a user of the method;
   (d) while continuing to perform steps (a) through (c) accepting input from a user of the method to select, from the first window, one of the graphical images being displayed;
   (e) while continuing to perform steps (a) through (c), storing, as a display table, a copy of the at least one packet containing the table represented by the graphical image selected in step (d);
   (f) while continuing to perform steps (a) through (c), creating a second window of the graphical display device for displaying the display table;
   (g) while continuing to perform steps (a) through (c), displaying the display table in the second window;
   (h) while continuing to perform steps (a) through (c), accepting input from the user to refresh the second window;
   (i) while continuing to perform steps (a) through (c), storing a copy of the at least one packet containing data most recently received in the test instrument for the table being displayed in the second window, as a replacement for the display table; and
   (j) while continuing to perform steps (a) through (c), displaying the replacement display table.

2. A method for displaying data in real time, said method comprising the steps of:
   (a) receiving at least one data packet for display, wherein the at least one data packet represents a table or partial table;
   (b) displaying a graphical image representing the table in a first window of a graphical display device, said displaying comprising the steps of
      (b1) when the location within the hierarchy of the packet received in step (a) is known, displaying the packet at the known location,
      (b2) when the location within the hierarchy of the packet received in step (a) is not known, displaying the packet at a top location within the hierarchy, and
      (b3) when a second packet is received that identifies the location of the packet displayed in step (b2), adjusting a location of the packet displayed in step (b2) to a location identified in the second packet;
   (c) repeating steps (a) and (b) until a stop command is received from a user of the method;
   (d) while continuing to perform steps (a) through (c), accepting input from a user of the method to select, from the first window, one of the graphical images being displayed;
   (e) while continuing to perform steps (a) through (c), storing, as a display table, a copy of the at least one packet containing the table represented by the graphical image selected in step (d);
   (f) while continuing to perform steps (a) through (c), creating a second window of the graphical display device for displaying the display table; and
   (g) while continuing to perform steps (a) through (c), displaying the display table in the second window.

3. A test instrument for displaying data in real time, said system comprising:
   a line interface for receiving at least one data packet for display, wherein the at least one data packet represents a table or partial table;
   a viewing system for displaying a graphical image representing the table in a first window of a graphical display device;
   a graphical input device for accepting input from a user of the test instrument to select, from the first window, one of the graphical images;
   a memory for storing, as a display table, a copy of the table represented by the graphical image selected by the graphical input device;
   means contained within the viewing system for displaying data from the display table in a second window of the graphical display device;
   means contained within the viewing system for accepting input from the user to refresh the second window;
   means for storing a copy of the at least one packet containing data most recently received in the test instrument for the table being displayed in the second window, as a replacement for the display table; and
   means for displaying the replacement display table.

4. A test instrument for displaying data in real time, said system comprising:

a line interface for receiving at least one data packet for display, wherein the at least one data packet represents a table or partial table;

a viewing system for displaying a graphical image representing the table in a first window of a graphical display device;

a graphical input device for accepting input from a user of the test instrument to select, from the first window, one of the graphical images;

a memory for storing, as a display table, a copy of the table represented by the graphical image selected by the graphical input device;

means contained within the viewing system for displaying data from the display table in a second window of the graphical display device;

means for displaying the at least one packet received by the line interface at a predetermined location within the hierarchy when the location of the at least one packet received is known;

means for displaying the at least one packet at a top location within the hierarchy, when the location within the hierarchy of the at least one packet received by the line interface is not known; and means for adjusting a location of the packet stored by the means for displaying the at least one packet at a top location within the hierarchy, when the line interface receives a second packet that identifies the location of the at least one packet stored by the means for displaying the at least one packet at a top location within the hierarchy.

5. A method for displaying data in real time, said method comprising the steps of:

(a) receiving at least one data packet for display, wherein the at least one data packet represents a table or partial table;

(b) displaying a graphical image representing the table in a first window of a graphical display device, comprising the steps of (b1) when the location within the hierarchy of the packet received in step (a) is known, displaying the packet at the known location, (b2) when the location within the hierarchy of the packet received in step (a) is not known, displaying the packet at a top location within the hierarchy, and (b3) when a second packet is received that identifies the location of the packet displayed in step (b2), adjusting a location of the packet displayed in step (b2) to a location identified in the second packet;

(c) repeating steps (a) and (b) until a stop command is received from a user of the method;

(d) while continuing to perform steps (a) through (c), accepting input from a user of the method to select, from the first window, one of the graphical images being displayed;

(e) while continuing to perform steps (a) through (c), storing, as a display table, a copy of the at least one packet containing the table represented by the graphical image selected in step (d);

(f) while continuing to perform steps (a) through (c), creating a second window of the graphical display device for displaying the display table;

(g) while continuing to perform steps (a) through (c), displaying the display table in the second window;

(h) while continuing to perform steps (a) through (c), accepting input from the user to refresh the second window;

(i) while continuing to perform steps (a) through (c), storing a copy of the at least one packet containing data most recently received in the test instrument for the table being displayed in the second window, as a replacement for the display table; and (j) while continuing to perform steps (a) through (c), displaying the replacement display table.

* * * * *